(12) United States Patent
Sakurai (10) Patent No.: US 10,464,110 B2
(45) Date of Patent: Nov. 5, 2019

(54) DUST COLLECTION APPARATUS AND DUST COLLECTION SYSTEM

(71) Applicant: Toshiba Memory Corporation, Tokyo (JP)

(72) Inventor: Hideaki Sakurai, Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 21 days.

(21) Appl. No.: 15/069,360

(22) Filed: Mar. 14, 2016

(65) Prior Publication Data

US 2017/0072437 A1 Mar. 16, 2017

(30) Foreign Application Priority Data

Sep. 14, 2015 (JP) .................. 2015-180911

(51) Int. Cl.
*B08B 3/14* (2006.01)
*B08B 17/00* (2006.01)
*B08B 3/04* (2006.01)
*C11D 11/00* (2006.01)
*B01D 47/02* (2006.01)

(52) U.S. Cl.
CPC ............ *B08B 17/00* (2013.01); *B01D 47/024* (2013.01); *B01D 47/027* (2013.01); *B08B 3/04* (2013.01); *C11D 11/0041* (2013.01); *B01D 2247/04* (2013.01)

(58) Field of Classification Search
CPC combination set(s) only.
See application file for complete search history.

(56) References Cited

U.S. PATENT DOCUMENTS

| 6,099,739 A * | 8/2000 | Kobayashi | B03C 1/284 210/103 |
| 6,428,709 B1 * | 8/2002 | Tsuihiji | B01D 25/164 210/739 |
| 2003/0119318 A1 * | 6/2003 | Niuya | G03F 7/422 438/690 |
| 2009/0011972 A1 * | 1/2009 | Suzuki | C11D 1/722 510/421 |

FOREIGN PATENT DOCUMENTS

| JP | 60-075837 U1 | 5/1985 |
| JP | 2000-334401 | 12/2000 |
| JP | 3296423 | 7/2002 |
| JP | 3341033 | 11/2002 |
| JP | 2008-062194 A1 | 3/2008 |
| JP | 2009-101269 A | 5/2009 |
| WO | WO 2014/132920 A1 | 9/2014 |

* cited by examiner

*Primary Examiner* — Jason Y Ko
*Assistant Examiner* — Cristi J Tate-Sims
(74) *Attorney, Agent, or Firm* — Finnegan, Henderson, Farbow, Garrett & Dunner, L.L.P.

(57) ABSTRACT

According to one embodiment, a dust collection apparatus includes a liquid supplier, a first member, and a liquid recoverer. One end of the first member is connected to the liquid supplier, one other end of the first member is connected to the liquid recoverer. The first member is conductive. The first member has a first surface including a plurality of trenches.

5 Claims, 10 Drawing Sheets

DUST COLLECTION APPARATUS AND DUST COLLECTION SYSTEM

CROSS-REFERENCE TO RELATED APPLICATIONS

This application is based upon and claims the benefit of priority from Japanese Patent Application No. 2015-180911, filed on Sep. 14, 2015; the entire contents of which are incorporated herein by reference.

FIELD

Embodiments described herein relate generally to a dust collection apparatus and a dust collection system.

BACKGROUND

Micro processing is implemented in the manufacturing processes of, for example, a semiconductor, a flat panel display, a solar panel, etc. The existence of dust particles (particles) that exist in the atmosphere is an example of one cause of defects in the micro processing. A dust collection apparatus removes such particles. It is desirable for the dust collection apparatus to be able to remove the particles efficiently.

DETAILED DESCRIPTION

According to one embodiment, a dust collection apparatus includes a liquid supplier, a first member, and a liquid recoverer. One end of the first member is connected to the liquid supplier, one other end of the first member is connected to the liquid recoverer. The first member is conductive. The first member has a first surface including a plurality of trenches.

According to another embodiment, a dust collection system includes a dust collection apparatus and a processing chamber. The dust collection apparatus includes a liquid supplier, a liquid recoverer, and a first member. One end of the first member is connected to the liquid supplier, one other end of the first member is connected to the liquid recoverer. The first member is conductive. The first member has a first surface including a plurality of trenches. The processing chamber contains the dust collection apparatus.

Embodiments of the invention will now be described with reference to the drawings.

The drawings are schematic or conceptual; and the relationships between the thicknesses and widths of portions, the proportions of sizes between portions, etc., are not necessarily the same as the actual values thereof. The dimensions and/or the proportions may be illustrated differently between the drawings, even in the case where the same portion is illustrated.

In this specification and each drawing, components similar to ones described in reference to an antecedent drawing are marked with the same reference numerals, and a detailed description is omitted as appropriate.

First Embodiment

Figure 1A:
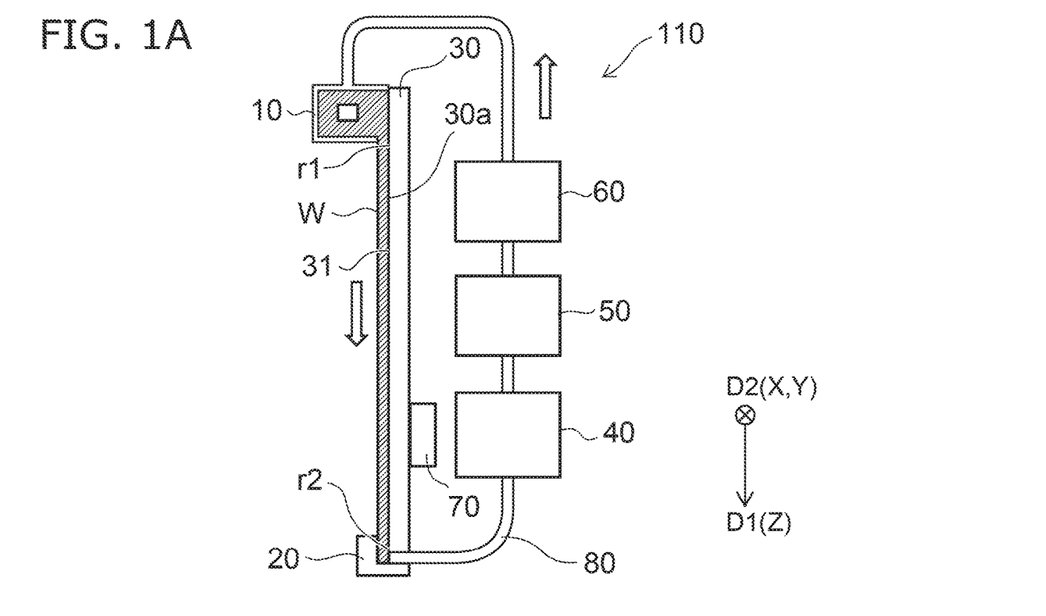
FIG. 1A and FIG. 1B are schematic views showing a dust collection apparatus according to a first embodiment.
Figure 1B:
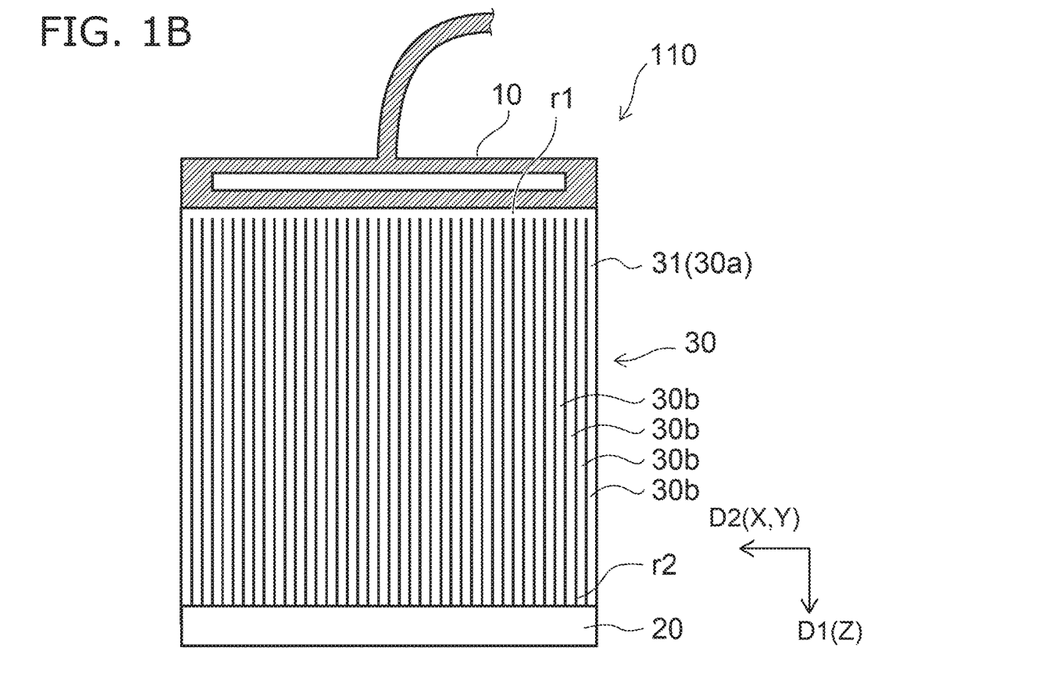

FIG. 1A and FIG. 1B are schematic views showing a dust collection apparatus according to a first embodiment.

FIG. 1A is a schematic cross-sectional view showing the dust collection apparatus.

FIG. 1B is a schematic plan view showing the dust collection apparatus.

As shown in FIG. 1A and FIG. 1B, the dust collection apparatus 110 according to the embodiment includes a liquid supplier 10, a liquid recoverer 20, a first member 30, a discharge pump 40, a liquid source 50, a filtering circulator 60, a temperature adjuster 70, and a pipe 80.

An example is illustrated in the embodiment in which the first member 30 is vertically placed. In other words, the liquid supplier 10 is positioned above the liquid recoverer 20. "Above" is the direction opposite to the direction of gravity.

The liquid supplier 10 supplies, to the first member 30, a liquid W flowing in from the liquid source 50. For example, purified water is used as the liquid W. For example, the specific resistance (the electrical resistivity) or the conductivity can be used as an index of the purity of water. The specific resistance of purified water is, for example, not less than 0.1 megohm·centimeter (MΩ·cm) and not more than 15 MΩ·cm. The theoretical specific resistance of purified water is about 18.2 megohm·centimeter (MΩ·cm) at 25° C. Water that infinitesimally approaches the theoretical specific resistance is called ultra pure water. Ultra pure water may be used as the liquid W.

The liquid source 50 may be switched between the liquid W and a cleaning liquid. That is, the liquid source 50 may be switched to the liquid W when using the dust collection apparatus 110; and in the maintenance of the dust collection apparatus 110, the first member 30, etc., may be cleaned by switching the liquid source 50 to the cleaning liquid.

One end of the first member 30 is connected to the liquid supplier 10; and one other end of the first member 30 is connected to the liquid recoverer 20. The first member 30 has a first surface 30a that has multiple trenches 30b. The liquid W that is supplied from the liquid supplier 10 flows along the first surface 30a. The first surface 30a includes a first region r1 and a second region r2. The liquid W is supplied from the liquid supplier 10 to the first region r1. The liquid W is recovered by the liquid recoverer 20 in the second region r2.

The direction from the first region r1 (the liquid supplier 10) toward the second region r2 (the liquid recoverer 20) is taken as a first direction D1. One direction intersecting the first direction D1 is taken as a second direction D2. In the example, the first direction D1 is aligned with a Z-direction (the vertical direction). The second direction D2 is aligned with an X-direction or a Y-direction (the lateral direction). In the example, the first member 30 that has a flat plate configuration is described as an example. The configuration of the first member 30 is not limited to a flat plate configuration. The configuration of the first member 30 may be, for example, a prism configuration, a pyramidal configuration, a circular columnar configuration, a circular conic configuration, etc.

The multiple trenches 30b extend in the first direction D1 and are arranged in the second direction D2. The width of the trench 30b is, for example, not less than 1 millimeter (mm) and not more than 6 mm. The liquid W flows uniformly over the first surface 30a; and a thin liquid film is formed of the liquid W. For example, particles that float around the dust collection apparatus 110 inside the sealed space contact the liquid W. The particles that contact the liquid W flow with the liquid W and are discharged outside the sealed space. Thereby, the particles that are inside the sealed space can be removed efficiently.

The first member 30 is conductive. The material of the first member 30 includes, for example, a metal that is relatively resistant to rust. For example, it is favorable to use aluminum, stainless steel, etc. It is desirable for the first member 30 also to have excellent chemical resistance. Therefore, a nickel alloy that includes molybdenum, chrome, etc., with a major component of nickel may be used. For example, hastelloy C-22 (registered trademark) is an example of the nickel alloy. The composition ratio (Wt %) of the major elements is, for example, Ni:56, Cr:22, Mo:13, Fe:3, and W:3. If a non-conductive resin such as acrylic or the like is included in the material of the first member 30, there is a possibility that the first member 30 may be undesirably charged. Therefore, it is undesirable.

The liquid W that is on the first surface 30a flows in the direction of the liquid recoverer 20 from the liquid supplier 10. It is desirable for the flow of the liquid W to be a uniform laminar flow. Here, laminar flow refers to a flow that is orderly and regular. Conversely, turbulent flow refers to an irregular flow. If a turbulent flow of the liquid W occurs at the first surface 30a, there is a possibility that a dry portion, etc., of the first surface 30a where the liquid W does not flow locally may be exposed undesirably. The liquid W can be caused to flow uniformly over the entire region of the first surface 30a by causing the flow of the liquid W to be a laminar flow.

For example, the dimensionless Reynolds number Re can be used to discriminate between laminar flow and turbulent flow. The critical Reynolds number at which it is known experimentally that laminar flow transitions to turbulent flow is about 2000 to 4000 for flow inside a circular pipe and about 500,000 for a flat plate surface.

A film 31 that is hydrophilic is provided at the first surface 30a. For example, the film 31 of a hydrophilic material is coated onto the first surface 30a. For example, hydrophilic is defined as having a water contact angle of 40 degrees or less. Thereby, the liquid W spreads thinly and uniformly; and a more stable laminar state can be obtained. For example, it is desirable for the material of the film 31 to include titanium oxide. Titanium oxide is one photocatalytic material.

Titanium oxide is hydrophilic when absorbing ultraviolet light. Titanium oxide also has the effect of removing dirt by causing the dirt of the surface to float away. Therefore, dirt does not attach easily to the first surface 30a; and maintenance is easy. The filtering circulator 60 is connected between the liquid recoverer 20 and the liquid supplier 10. The liquid recoverer 20 recovers the liquid W flowing over the first surface 30a. The liquid recoverer 20 and the discharge pump 40 are connected via the pipe 80. The liquid W that is recovered by the liquid recoverer 20 is drawn up by driving the discharge pump 40. The liquid W that is drawn up is sent to the filtering circulator 60 via the liquid source 50. The liquid W is filtered in the filtering circulator 60; and the filtered liquid W is returned to the liquid supplier 10. For example, the filter includes a filter for a liquid. It is desirable for the filter to be able to remove particles of 10 nanometers (nm) or less. Thereby, the liquid W can be filtered and circulated. Thereby, the consumed amount of the liquid W can be suppressed; and the running cost can be reduced.

The temperature adjuster 70 adjusts the temperature of the first surface 30a. The temperature adjuster 70 includes, for example, a heater embedded in the first surface 30a. For example, the temperature adjuster 70 adjusts the temperature of the first surface 30a to be contained in a range not less than $-10°$ C. and not more than 30° C. Thereby, the temperature adjustment of the liquid W is possible. Humidity adjustment inside the space where the dust collection apparatus 110 is mounted is possible by such a temperature adjustment.

Here, it is desirable to reduce the defects of the pattern as the pattern is downscaled for semiconductor manufacturing, etc. Particles that exist in the atmosphere inside the processing chamber are an example of one major cause of pattern defects. The particles become pattern defects by adhering to the processing substrate and by going through several processes.

The processing substrate is exposed to the atmosphere inside the processing chamber at a stage prior to the processing. Inside the processing chamber, filtering is performed by a HEPA filter (High Efficiency Particulate Air Filter), an ULPA filter (Ultra Low Penetration Air Filter), etc.; and humidification, temperature adjustment, etc., also are performed. However, this is insufficient when internal dust inside the processing chamber or airborne particles that are ultra micro nano-sized (e.g., 10 nm or less) cannot be removed by the HEPA filter and the ULPA filter, etc.

In particular, it is often that nano-sized particles substantially are not affected by gravity; and there is a risk that the nano-sized particles may continue to float around inside the processing chamber. Various contrivances such as using an electrical dust collector, performing local exhaust, optimizing the air flow, etc., are used as technology to efficiently reduce the nano-sized particles floating inside the processing chamber. However, the dust collection efficiency of the dust collector is insufficient; many mechanical parts are included; and some amount of mounting space is necessary. For local exhaust and air flow control, the air flow cannot be controlled completely due to the effects of the various structures inside the processing chamber. Therefore, the particles cannot be exhausted completely; and the particles remaining inside the processing chamber continue to float. For any of these methods, it is difficult to remove the nano-sized particles floating inside the processing chamber.

Conversely, according to the embodiment, the first member 30 is provided between the liquid supplier 10 and the liquid recoverer 20. The first member 30 includes the first surface 30a where the liquid W flows, and the multiple trenches 30b that are provided in the first surface 30a. The flow of the liquid W can be controlled by the liquid W flowing on the multiple trenches 30b. As a result, the turbulence of the flow of the liquid W can be reduced. Thereby, a stable air flow occurs at the vicinity where the liquid W flows. By the stable air flow occurring, the nano-sized particles attach to the liquid W without floating around inside the processing chamber.

A thin liquid film is formed on the first surface 30a. A dried unutilized portion, i.e., a portion where the particles cannot attach, does not exist locally in the liquid film. Therefore, the particles can be removed efficiently. Further, the dust collection apparatus 110 can be mounted easily to the inner wall (the side surface, the bottom surface, etc.) of the processing chamber, etc. It is possible to add-on the dust collection apparatus 110 to existing equipment as well. The dust collection apparatus 110 does not need much mounting space because the structure of the dust collection apparatus 110 is compact.

Figure 2A:
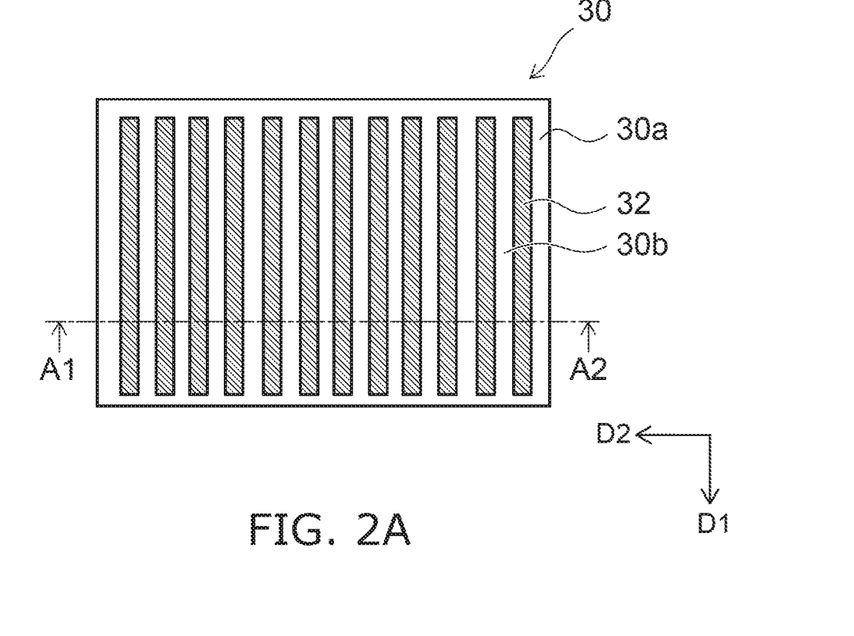
FIG. 2A and FIG. 2B are schematic views showing a trench pattern of the multiple trenches provided in the first surface.
Figure 2B:
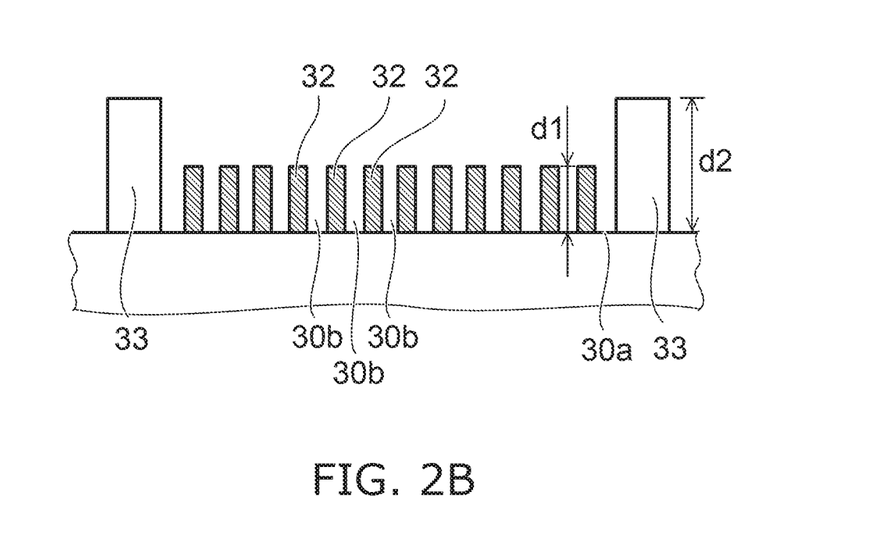

FIG. 2A and FIG. 2B are schematic views showing a trench pattern of the multiple trenches 30b provided in the first surface 30a.

FIG. 2A is a schematic plan view showing the trench pattern.

FIG. 2B shows an A1-A2 cross section of the trench pattern of FIG. 2A.

As shown in FIG. 2A, the multiple trenches 30b may be provided in the first surface 30a to have the same spacing and the same width. The multiple trenches 30b extend in the first direction D1 and are arranged in the second direction D2. The width of the trench 30b is, for example, not less than 1 mm and not more than 6 mm. In the example, multiple protrusions 32 are provided on the first surface 30a as shown in FIG. 2B. The multiple protrusions 32 extend in the first direction D1 and are arranged in the second direction D2. The trenches 30b are provided between the multiple protrusions 32. A frame 33 is provided at two end portions of the first surface 30a along the first direction D1 with the multiple protrusions 32 interposed. The frame 33 functions as an embankment (a dike) that prevents overflowing of the liquid W. A height d1 of the protrusion 32 is, for example, not less than 2 mm and not more than 3 mm. The thickness of the liquid W is, for example, not less than 2 mm and not more than 5 mm. Therefore, it is desirable for a height d2 of the frame 33 to be, for example, not less than 5 mm and not more than 10 mm.

Figure 3A:
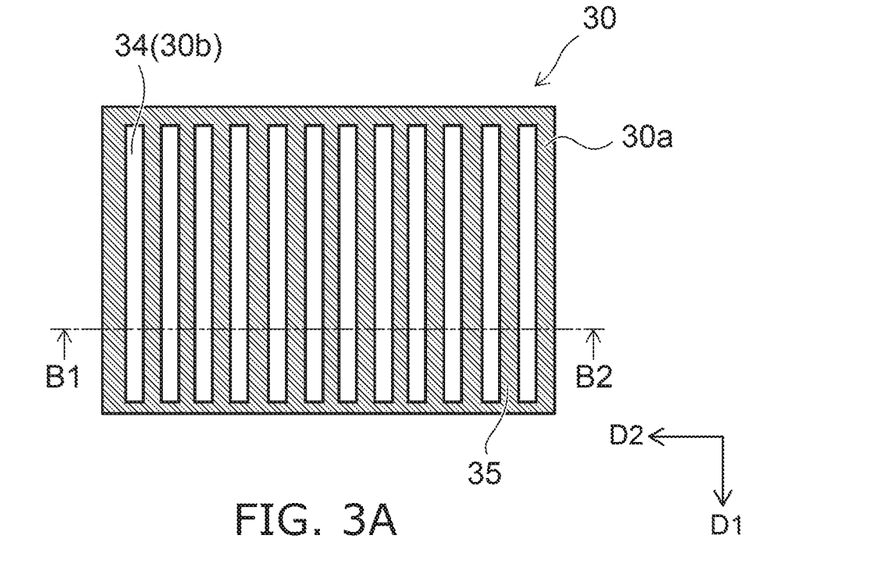
FIG. 3A and FIG. 3B are schematic views showing another trench pattern of the multiple trenches provided in the first surface.
Figure 3B:
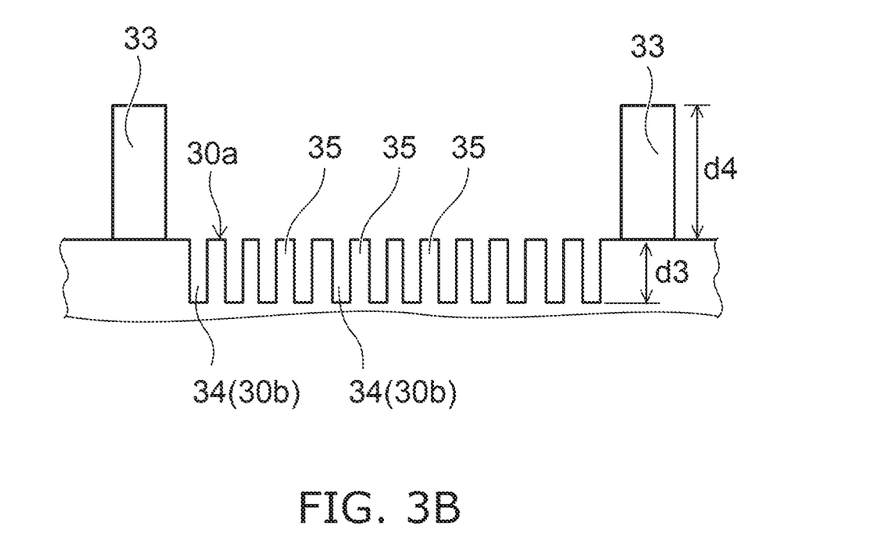

FIG. 3A and FIG. 3B are schematic views showing another trench pattern of the multiple trenches 30b provided in the first surface 30a.

FIG. 3A is a schematic plan view showing the trench pattern.

FIG. 3B shows a B1-B2 cross section of the trench pattern of FIG. 3A.

As shown in FIG. 3A and FIG. 3B, multiple recesses 34 may be provided under the first surface 30a. For example, the multiple recesses 34 may be provided to have the same spacing and the same width. Protrusions 35 are provided between the multiple recesses 34. The multiple recesses 34 extend in the first direction D1 and are arranged in the second direction D2. The multiple recesses 34 are used as the multiple trenches 30b. Similarly to the example of FIG. 2A and FIG. 2B, the frame 33 is provided at two end portions of the first surface 30a along the first direction D1. The frame 33 functions as an embankment (a dike) that prevents overflowing of the liquid W. A height d3 of the recess 34 is, for example, not less than 2 mm and not more than 3 mm.

The liquid W flows through the recesses 34. The thickness of the liquid W is, for example, not less than 2 mm and not more than 5 mm. In such a case, there is a possibility of a maximum overflow of 3 mm from the recesses 34. Therefore, it is desirable for a height d4 of the frame 33 to be, for example, 3 mm or more.

Figure 4A:
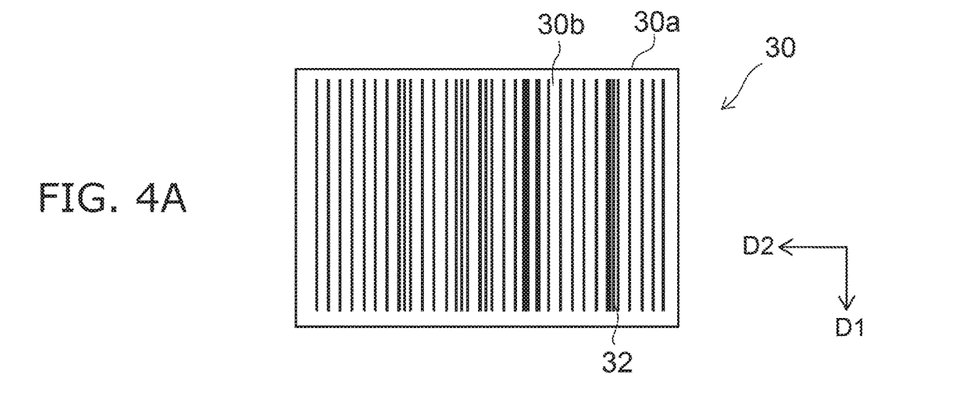
FIG. 4A to FIG. 4C are schematic plan views showing other trench patterns of the multiple trenches provided in the first surface.
Figure 4B:
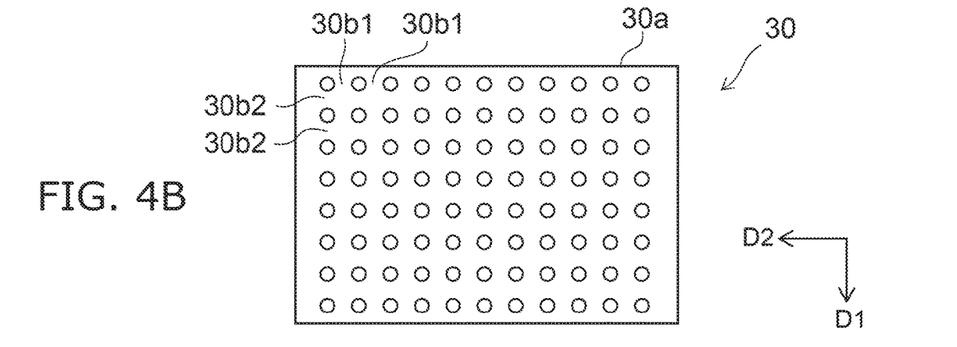
Figure 4C:
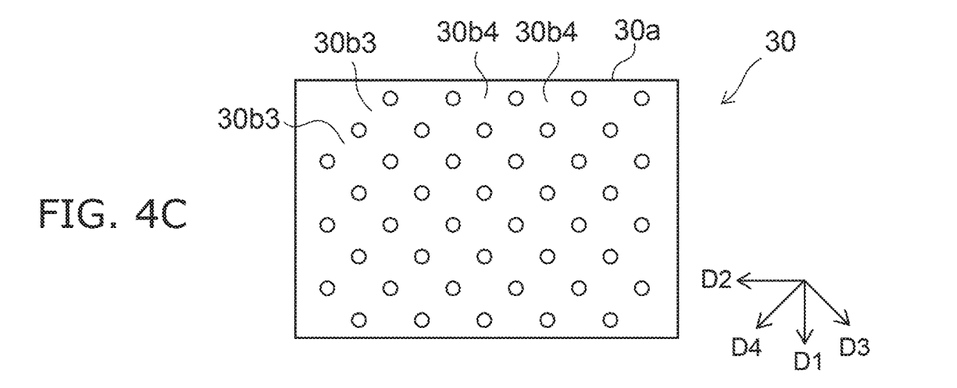

FIG. 4A to FIG. 4C are schematic plan views showing other trench patterns of the multiple trenches 30b provided in the first surface 30a.

As shown in FIG. 4A, the multiple trenches 30b may be provided to have an irregular spacing and an irregular width. The multiple trenches 30b extend in the first direction D1 and are arranged in the second direction D2. For example, the width of the trench 30b is set irregularly to be in a range not less than 50 nm and not more than 1 mm. In the example, the multiple protrusions 32 are provided to have an irregular spacing and width on the first surface 30a. The multiple protrusions 32 extend in the first direction D1 and are arranged in the second direction D2. The trenches 30b are provided between the multiple protrusions 32.

As in the example shown in FIG. 2A, FIG. 3A, and FIG. 4A, the liquid W can flow with low turbulence by providing the multiple trenches 30b along the flow of the liquid W. Also, it is possible to adjust the speed of the flow of the liquid W by changing the spacing and/or width of the multiple trenches 30b.

As shown in FIG. 4B, the multiple trenches 30b may include multiple first groove portions 30b1 and multiple second groove portions 30b2. The multiple first groove portions 30b1 extend in the first direction D1 and are arranged in the second direction D2. The multiple second groove portions 30b2 extend in the second direction D2, are arranged in the first direction D1, and intersect each of the multiple first groove portions 30b1.

As shown in FIG. 4C, the multiple trenches 30b may include multiple third groove portions 30b3 and multiple fourth groove portions 30b4. The multiple third groove portions 30b3 extend in a third direction D3 intersecting the first direction D1 and are arranged in a fourth direction D4 intersecting the third direction D3. The multiple fourth groove portions 30b4 extend in the fourth direction D4, are arranged in the third direction D3, and intersect each of the multiple third groove portions 30b3.

As in the example shown in FIG. 4B and FIG. 4C, it is possible to change the speed and/or orientation of the flow of the liquid W by providing the multiple trenches 30b along the two intersecting directions. Thereby, the liquid W that flows faster than necessary can be suppressed. The liquid W that flows excessively in a designated region can be suppressed. Thereby, the liquid W can be caused to flow over the first member 30 with low turbulence.

Figure 5A:
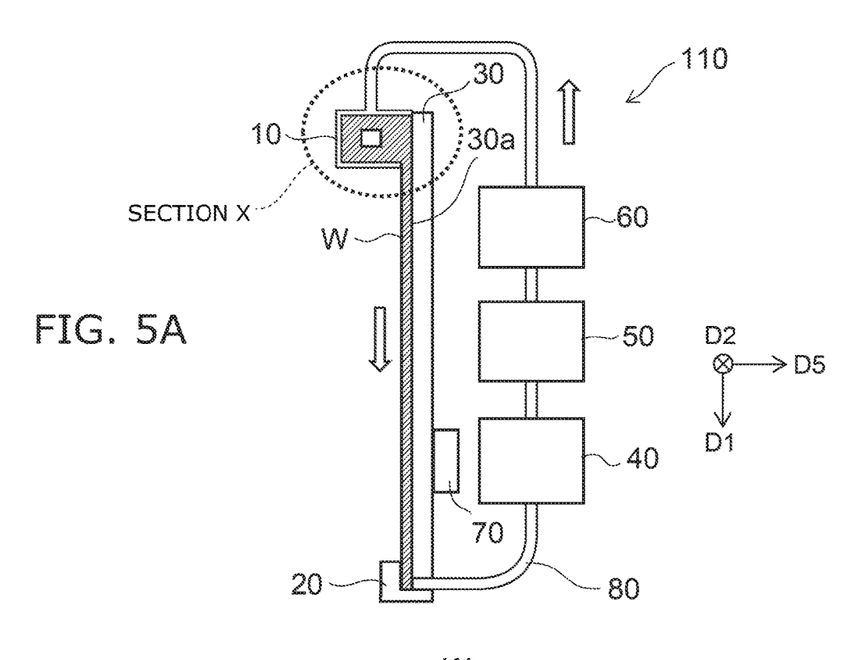
FIG. 5A to FIG. 5C are schematic views showing the liquid supplier according to the first embodiment.
Figure 5B:
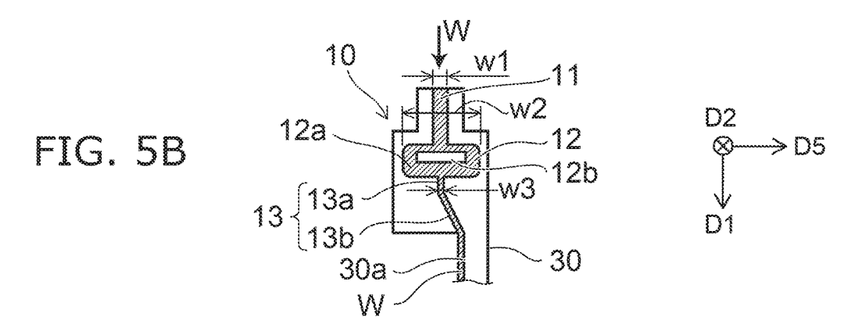
Figure 5C:
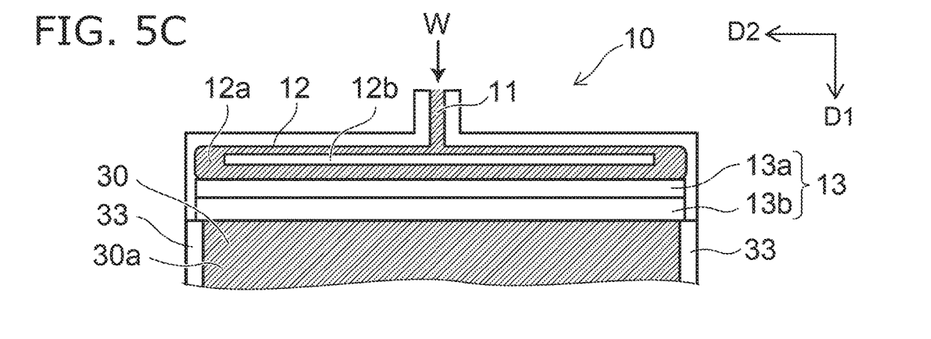

FIG. 5A to FIG. 5C are schematic views showing the liquid supplier 10 according to the first embodiment.

FIG. 5A is a schematic cross-sectional view showing the dust collection apparatus 110.

FIG. 5B is a schematic cross-sectional view in which section X of FIG. 5A is enlarged.

FIG. 5C is a schematic plan view in which section X of FIG. 5A is enlarged.

As shown in FIG. 5A to FIG. 5C, the liquid supplier 10 includes a first pipe portion 11, an intermediate portion 12, and a second pipe portion 13. The first pipe portion 11 includes a flow inlet. The second pipe portion 13 includes a flow outlet. The intermediate portion 12 is connected between the first pipe portion 11 and the second pipe portion 13. The liquid W flows into the first pipe portion 11. The intermediate portion 12 has a space 12a that collects the liquid W flowing in from the first pipe portion 11. A flow straightening plate 12b is disposed in the space 12a. The second pipe portion 13 causes the liquid W collected in the space 12a to flow out uniformly to the first surface 30a.

As shown in FIG. 5B, the first pipe portion 11 has a first width w1. The intermediate portion 12 (the space 12a) has a second width w2. The second pipe portion 13 has a third width w3. The second width w2 is wider than the first width w1. The third width w3 is narrower than the first width w1. For example, the first width w1, the second width w2, and the third width w3 are along a direction (a fifth direction D5) orthogonal to the inflow direction in which the liquid W flows through the first pipe portion 11. The first pipe portion 11 is not limited to one pipe portion and may be multiply provided.

A flow straightening plate 12b that has a flat plate configuration is provided in the space 12a of the intermediate portion 12. The length along the second direction D2 of the flow straightening plate 12b is longer than the length along the fifth direction D5 of the flow straightening plate 12b. It is desirable for the flow straightening plate 12b to include a hydrophilic material. For example, glass may be used. The liquid W spreads uniformly inside the space 12a via the flow straightening plate 12b and is sent to the second pipe portion 13.

The second pipe portion 13 includes a first slit portion 12a and a second slit portion 13b. It is desirable for the surfaces of the first slit portion 12a and the second slit portion 12b to be hydrophilic. The liquid W that passes through the first slit portion 12a and the second slit portion 12b becomes a thin and uniform liquid film and is sent to the first surface 30a.

In the example, the first slit portion 12a has a slender rectangular configuration in the second direction D2 when projected onto a plane orthogonal to the first direction D1. The first slit portion 12a extends along the first direction D1 and is connected to the second slit portion 13b. The second slit portion 12b is provided to be continuous with the first slit portion 13a. The second slit portion 12b is tilted with respect to the first surface 30a. That is, the second pipe portion 13 is disposed to be tilted with respect to the first surface 30a. The direction in which the liquid W flows out from the second pipe portion 13 intersects the first surface 30a. Thus, the scattering of the liquid W can be suppressed by causing the liquid W to flow out from a direction that intersects the first surface 30a.

The width of the slit may not be the same between the first slit portion 12a and the second slit portion 13b. The width of the slit may have a distribution for the first slit portion 13a and the second slit portion 13b. Instead of slits, multiple holes may be provided for the liquid W to pass through.

Figure 6A:
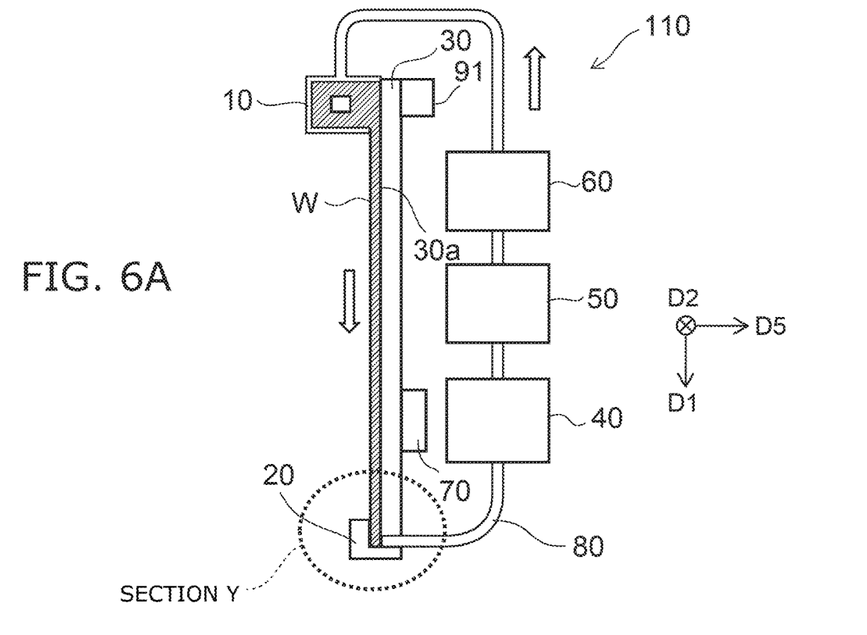
FIG. 6A to FIG. 6C are schematic views showing the liquid recoverer according to the first embodiment.
Figure 6B:
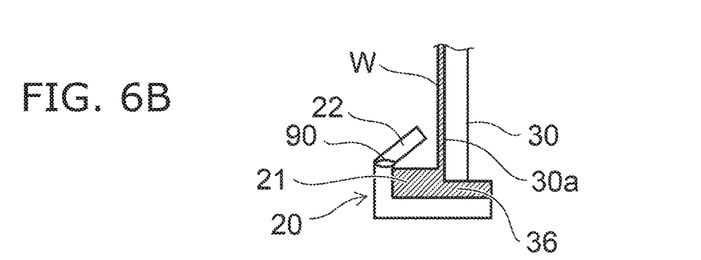
Figure 6C:
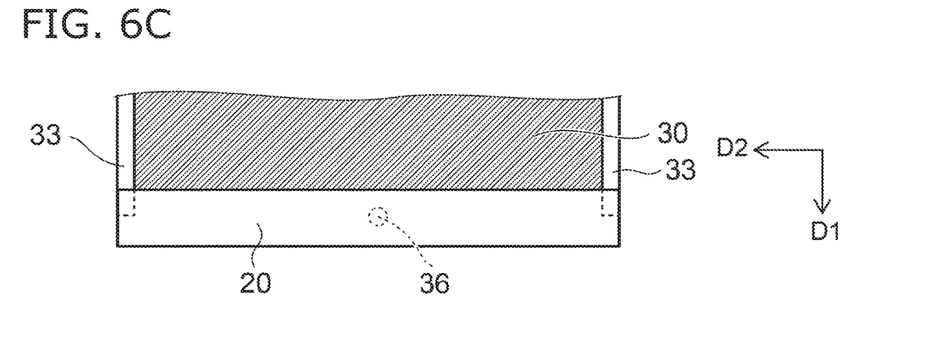

FIG. 6A to FIG. 6C are schematic views showing the liquid recoverer 20 according to the first embodiment.

FIG. 6A is a schematic cross-sectional view showing the dust collection apparatus 110.

FIG. 6B is a schematic cross-sectional view in which section Y of FIG. 6A is enlarged.

FIG. 6C is a schematic plan view in which section Y of FIG. 6A is enlarged.

As shown in FIG. 6A to FIG. 6C, the liquid recoverer 20 includes a space 21 and an upper lid portion 22. An opening 36 that is connected to the space 21 is provided in the first member 30. The space 21 can collect the liquid W flowing over the first surface 30a. The space 21 is surrounded with a side wall provided around the space 21. A portion of the side wall provided around the space 21 includes, for example, the lower end portion of the first member 30. The opening 36 that is connected to the space 21 is provided at the lower end portion of the first member 30. The opening 36 discharges the liquid W collected in the space 21. The opening 36 is connected to the discharge pump 40 via the pipe 80.

The upper lid portion 22 is positioned on the space 21. The upper lid portion 22 is provided to be tilted to be obliquely upward with respect to the bottom portion of the liquid recoverer 20. By providing the upper lid portion 22, the liquid W that flows into the space 21 can be prevented from scattering.

As shown in FIG. 6A and FIG. 6B, the dust collection apparatus 110 further includes a sensor 90 and a controller 91. The sensor 90 senses the position of the surface (the liquid surface) of the liquid W collected in the space 21. For example, various sensors such as an ultrasonic sensor, an optical sensor, etc., may be used as the sensor 90. The controller 91 controls the supply amount of the liquid W based on the sensing result of the sensor 90. The controller 91 includes a CPU (Central Processing Unit), memory, etc. The sensing result of the sensor 90 is output to the controller 91. The controller 91 compares the value of the liquid surface (the sensed liquid surface) of the liquid W sensed by the sensor 90 to the value of a predetermined reference liquid surface; and in the case where the value of the sensed liquid surface is less than the value of the reference liquid surface, the controller 91 controls the liquid supplier 10 and increases the supply amount of the liquid W. The controller 91 compares the value of the sensed liquid surface to the value of the reference liquid surface; and in the case where the value of the sensed liquid surface is greater than the value of the reference liquid surface, the controller 91 controls the liquid supplier 10 and reduces the supply amount of the liquid W.

The liquid supplier 10 includes the second pipe portion 13 that causes the liquid W to flow out. For example, the slit width of the second pipe portion 13 is adjustable. Thus, the supply amount of the liquid W may be controlled by adjusting the slit width of the second pipe portion 13 based on an instruction of the controller 91.

Thereby, the supply amount of the liquid W can be controlled to be constant. Therefore, the state of the flow of the liquid W can be more stable.

An example is described in the description recited above in which purified water or ultra pure water is used as the liquid W. The liquid W may include charged bubbles. For example, negatively charged microbubbles, ultra-fine bubbles, etc., are examples of such bubbles. In the case of microbubbles, the diameter of the bubble is, for example, not less than 10 micrometers (μm) and not more than 50 μm. In the case of ultra-fine bubbles, the diameter of the bubble is, for example, 1 μm or less. At least one of the microbubbles or the ultra-fine bubbles is mixed into the liquid W. It is possible to further improve the removal effect of the particles by the charged effect of the microbubbles and the ultra-fine bubbles.

Second Embodiment

Figure 7A:
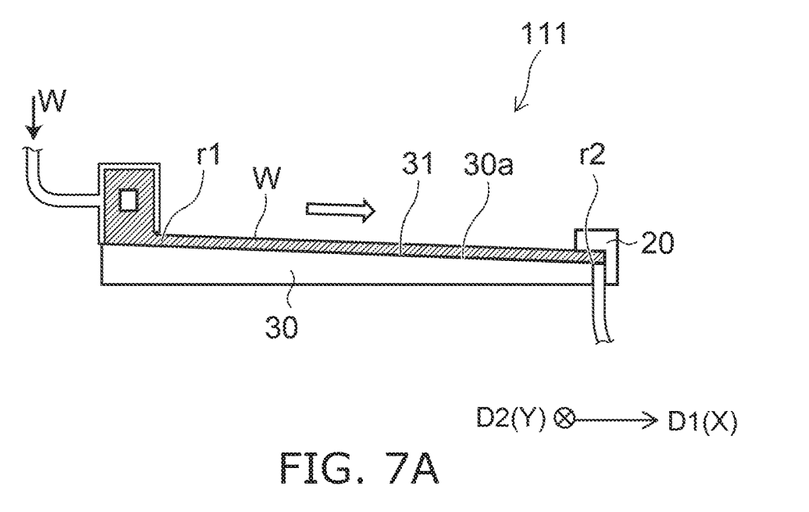
FIG. 7A and FIG. 7B are schematic views showing a portion of a dust collection apparatus according to a second embodiment.
Figure 7B:
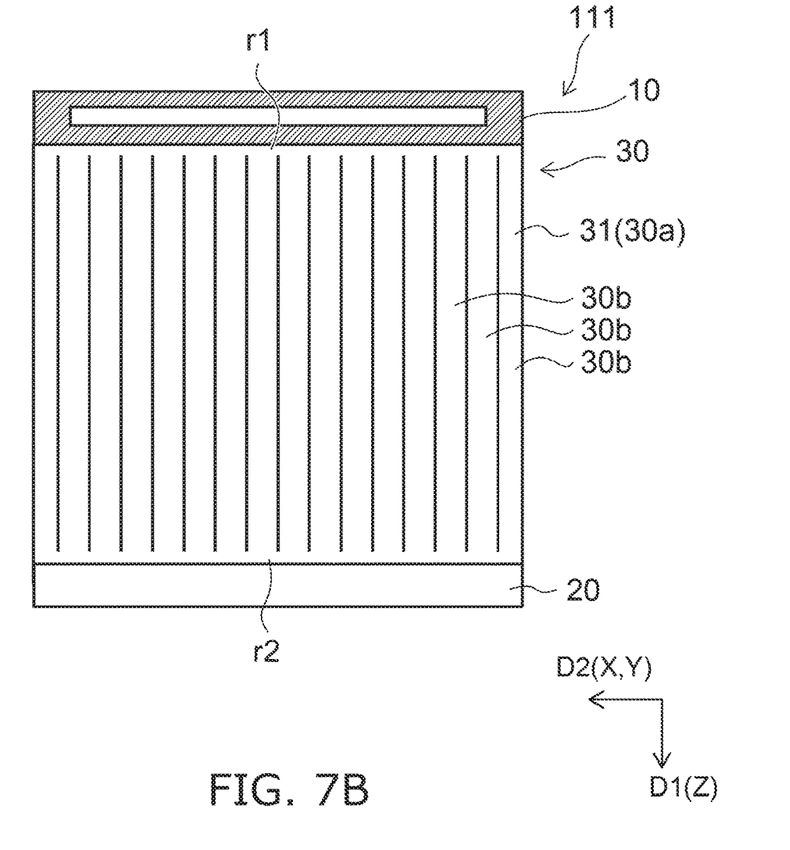

FIG. 7A and FIG. 7B are schematic views showing a portion of a dust collection apparatus according to a second embodiment.

FIG. 7A is a schematic cross-sectional view showing the dust collection apparatus.

FIG. 7B is a schematic plan view showing the dust collection apparatus.

In the dust collection apparatus 111 according to the embodiment, the first member 30 is disposed to be horizontally placed. Similarly to the dust collection apparatus 110 of the first embodiment, the dust collection apparatus 111 includes the liquid supplier 10, the liquid recoverer 20, and the first member 30. The other components are not shown. The first direction D1 is the direction from the first region r1 toward the second region r2. The second direction D2 is a direction that intersects the first direction D1. In the example, the first direction D1 is the X-direction. The second direction D2 is the Y-direction. The dust collection apparatus 111 may be rotated 90 degrees so that the first direction D1 is the Y-direction and the second direction D2 is the X-direction.

The liquid supplier 10 is disposed at a position that is higher than the liquid recoverer 20 at a side of the liquid recoverer 20. The first surface 30a of the first member 30 is tilted toward the direction of gravity. Due to the tilt, the liquid W flows smoothly over the first surface 30a from the liquid supplier 10 toward the liquid recoverer 20.

The other configurations are the same as those of the vertically-placed dust collection apparatus 110 described in the first embodiment. In other words, the first member 30 includes the first surface 30a where the liquid W flows, and the multiple trenches 30b that are provided in the first surface 30a.

The multiple trenches 30b extend in the first direction D1 and are arranged in the second direction D2. The width of the trench 30b is, for example, not less than 1 mm and not more than 6 mm. The liquid W flows uniformly over the first surface 30a; and a liquid film of the liquid W is formed on the first surface 30a. For example, particles that float around the dust collection apparatus 110 inside the sealed space contact the liquid W. The particles that contact the liquid W flow with the liquid W and are discharged outside the sealed space. Thereby, the particles that are inside the sealed space can be removed efficiently.

Thus, according to the horizontally-placed dust collection apparatus 111, mounting can be performed easily to the bottom surface of the processing chamber, etc. Even in the case of the horizontal placement, similarly to the vertical placement, the particles that contact the liquid film of the liquid W can be removed efficiently.

Third Embodiment

Figure 8A:
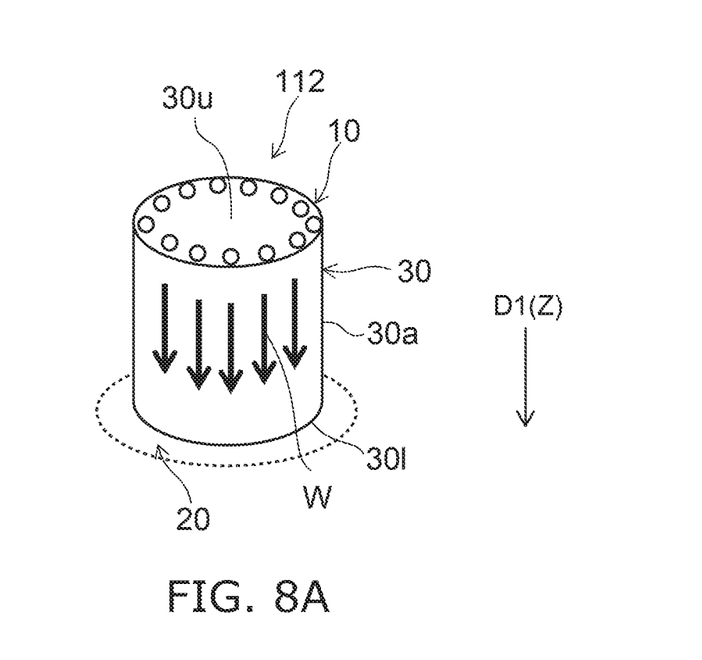
FIG. 8A and FIG. 8B are schematic views showing portions of a dust collection apparatus according to a third embodiment.
Figure 8B:
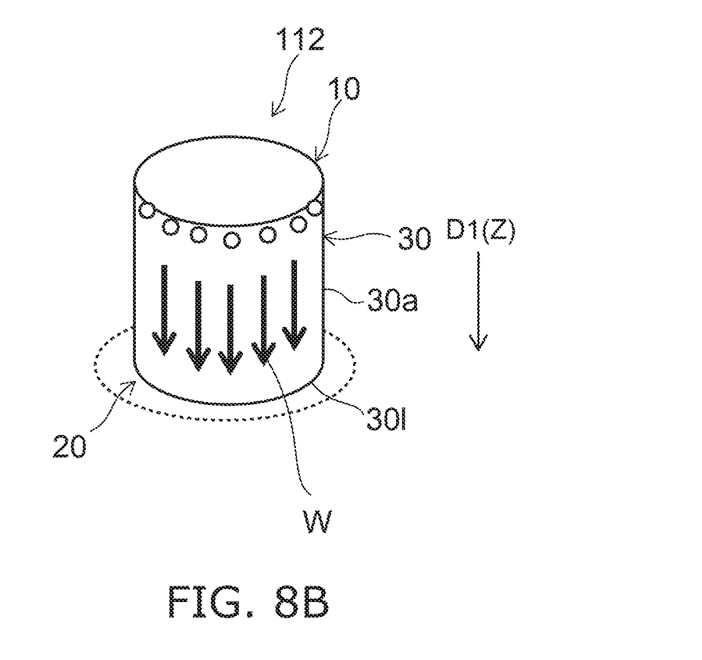

FIG. 8A and FIG. 8B are schematic views showing portions of a dust collection apparatus according to a third embodiment.

As shown in FIG. 8A and FIG. 8B, the dust collection apparatus 112 according to the embodiment includes the first member 30 having a circular columnar configuration. It is sufficient for the first member 30 to have a stable configuration that can be self-supporting. For example, the first member 30 may have a circular conic configuration, a prism configuration, a pyramidal configuration, etc.

In the case of the example of FIG. 8A, the liquid supplier 10 is provided at an upper surface 30u of the first member 30 having the circular columnar configuration. The liquid supplier 10 is provided along the periphery of the upper surface 30u and supplies the liquid W to the first surface 30a of the first member 30. The liquid recoverer 20 is provided at a lower portion 301 of the first member 30. The liquid recoverer 20 is provided along the periphery of the lower portion 301 and recovers the liquid W flowing over and dropping from the first surface 30a. The liquid W flows along the first direction D1. In the example, the first direction D1 is the Z-direction.

In the case of the example of FIG. 8B, the liquid supplier 10 is provided at the first surface 30a of the first member 30 having the circular columnar configuration. The liquid supplier 10 is provided along the upper end of the first surface 30a and supplies the liquid W to the first surface 30a of the first member 30. The liquid recoverer 20 is provided at the lower portion 301 of the first member 30. The liquid recoverer 20 is provided along the periphery of the lower portion 301 and recovers the liquid W flowing over and dropping from the first surface 30a. The liquid W flows along the first direction D1. In the example, the first direction D1 is the Z-direction.

In either example of FIG. 8A and FIG. 8B, multiple holes for supplying the liquid W are provided in the liquid supplier 10. Instead of the multiple holes, slits may be provided in the liquid supplier 10.

Thus, the configuration of the dust collection apparatus 112 is a configuration that can be self-supporting. Thereby, it is possible to place the dust collection apparatus unrestrictedly not only on the inner wall of the processing chamber but also on the floor surface of the processing chamber, etc.

Fourth Embodiment

Figure 9:
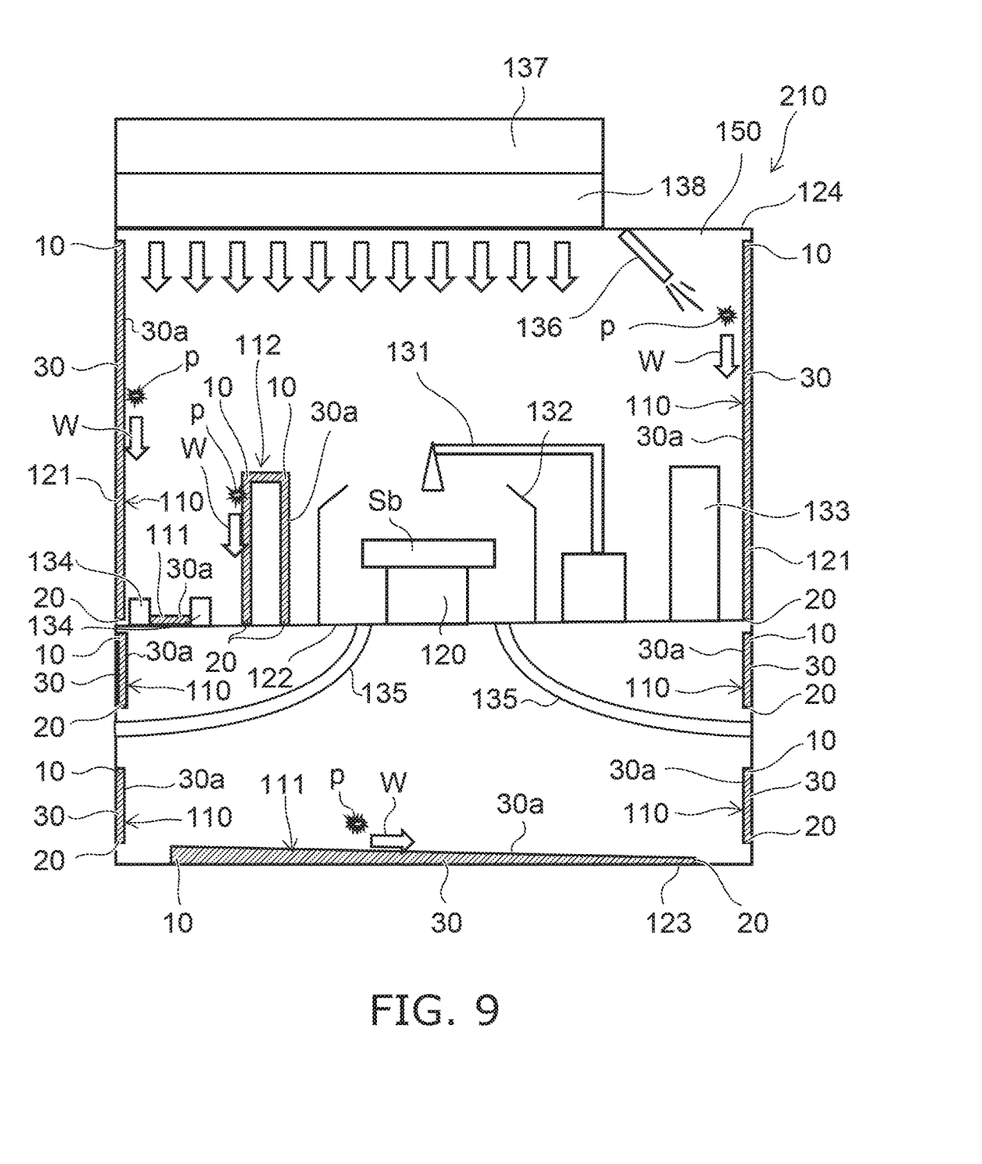
FIG. 9 is a schematic view showing a dust collection system according to a fourth embodiment.

FIG. 9 is a schematic view showing a dust collection system according to a fourth embodiment.

The dust collection system 210 according to the embodiment includes dust collection apparatuses 110, 111, and 112 and a processing chamber 150. The processing chamber 150 contains the dust collection apparatuses 110, 111, and 112. In the example, a developing chamber of photomask manufacturing is shown as the processing chamber 150.

The processing chamber 150 includes a support platform 120 that supports a processing object Sb, a side surface 121 that is provided around the support platform 120, a mounting surface 122 where the support platform 120 is mounted, a bottom surface 123 that is provided on the lower side of the mounting surface 122, and an upper surface 124 that is provided on the upper side of the mounting surface 122. The side surface 121 is provided around the support platform 120 with a direction from the bottom surface 123 toward the support platform 120 as an axis. In the example, the processing object Sb is, for example, a photomask substrate.

The processing chamber 150 further includes a processing nozzle 131 that supplies a developing liquid to the surface of the processing object Sb, a processing cup 132 that prevents the developing liquid and the rinsing liquid from scattering to the outside, wiring/instruments 133, a vent hole 134, a local exhaust port 135, a gas supplier 136, a first filter 137, and a second filter 138.

The support platform 120, the processing nozzle 131, the processing cup 132, and the wiring/instruments 133 are provided on the mounting surface 122. The local exhaust port 135 is provided between the mounting surface 122 and the bottom surface 123. The first filter 137 and the second filter 138 are provided on the upper surface 124. The first filter 137 includes, for example, at least one of a HEPA filter or an ULPA filter. The second filter 138 includes, for example, a chemical filter or the like. A down-flow is formed inside the processing chamber 150 and escapes through the bottom surface 123.

Each of the dust collection apparatuses 110 to 112 includes the liquid supplier 10, the liquid recoverer 20, and the first member 30. The dust collection apparatus 110 is provided attachably and removably to the side surface 121. The dust collection apparatus 111 is provided attachably and removably to the mounting surface 122 and to the bottom surface 123. The fixing method of the dust collection apparatus 110 to the surfaces is not particularly limited as long as the dust collection apparatus 110 is attachable and removable. For example, prescribed fixing members such as bolts, nuts, screws, etc., may be used.

Although the dust collection apparatus 110 is formed as a separate body from the side surface 121, the dust collection apparatus 110 may be formed as one body with the side surface 121. In such a case, the first surface 30a of the first member 30 is a portion of the side surface 121. Similarly, although the dust collection apparatus 111 is formed as a separate body from the mounting surface 122 and the bottom surface 123, the dust collection apparatus 111 may be formed as one body with the mounting surface 122 and the bottom surface 123. In such a case, the first surface 30a is a portion of the mounting surface 122. The first surface 30a is a portion of the bottom surface 123.

The first member 30 has the first surface 30a where the liquid W flows. In the case of the dust collection apparatus 110 in which the first surface 30a is disposed along the side surface 121, the liquid supplier 10 is positioned above the liquid recoverer 20.

In the case of the dust collection apparatus 111 in which the first surface 30a is disposed along the mounting surface 122 or the bottom surface 123, the liquid supplier 10 is disposed at a position that is higher than the liquid recoverer 20 at the side of the liquid recoverer 20. The first surface 30a is tilted with respect to the direction of gravity. In the example, the tilted surface of the dust collection apparatus 111 that is disposed along the mounting surface 122 is formed in the depth direction (the Y-direction).

The dust collection apparatus 112 is placed on the mounting surface 122. For example, the dust collection apparatus 112 has a cylindrical configuration such as that described in reference to FIG. 8A and FIG. 8B. From the perspective of overturning prevention, it is desirable for the dust collection apparatus 112 to be fixed attachably and removably to the mounting surface 122.

Thus, in the dust collection system 210, the dust collection apparatuses 110 to 112 are contained inside the processing chamber 150. The first member 30 is provided between the liquid supplier 10 and the liquid recoverer 20 in each of the dust collection apparatuses 110 to 112. The first member 30 includes the first surface 30a where the liquid W flows, and the multiple trenches 30b provided in the first surface 30a (referring to FIG. 1B and the like). Due to the multiple trenches 30b, the liquid W flows uniformly; and a liquid film is formed on the first surface 30a.

Therefore, a dried unutilized portion, i.e., a portion where the particles p cannot attach, does not exist locally in the liquid film on the first surface 30a. Therefore, the particles p can be removed efficiently.

Because the dust collection apparatuses 110 and 111 have flat plate configurations, mounting can be performed easily to the side surface 121, the mounting surface 122, the bottom surface 123, etc., of the processing chamber 150. Because the dust collection apparatus 112 has a cylindrical configuration, placing can be performed easily to the mounting surface 122, etc., inside the processing chamber 150. It is possible to add-on the dust collection apparatuses 110 to 112 to existing equipment as well. The dust collection apparatuses 110 to 112 do not need much mounting space because the structures of the dust collection apparatuses 110 to 112 are compact.

Figure 10A:
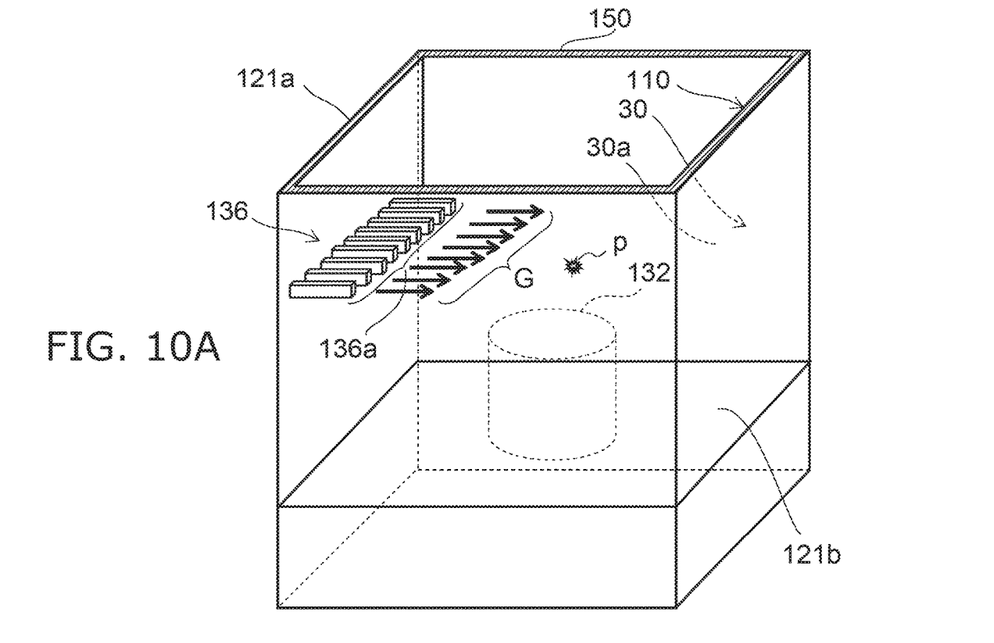
FIG. 10A and FIG. 10B are schematic views showing the gas supplier of FIG. 9.
Figure 10B:
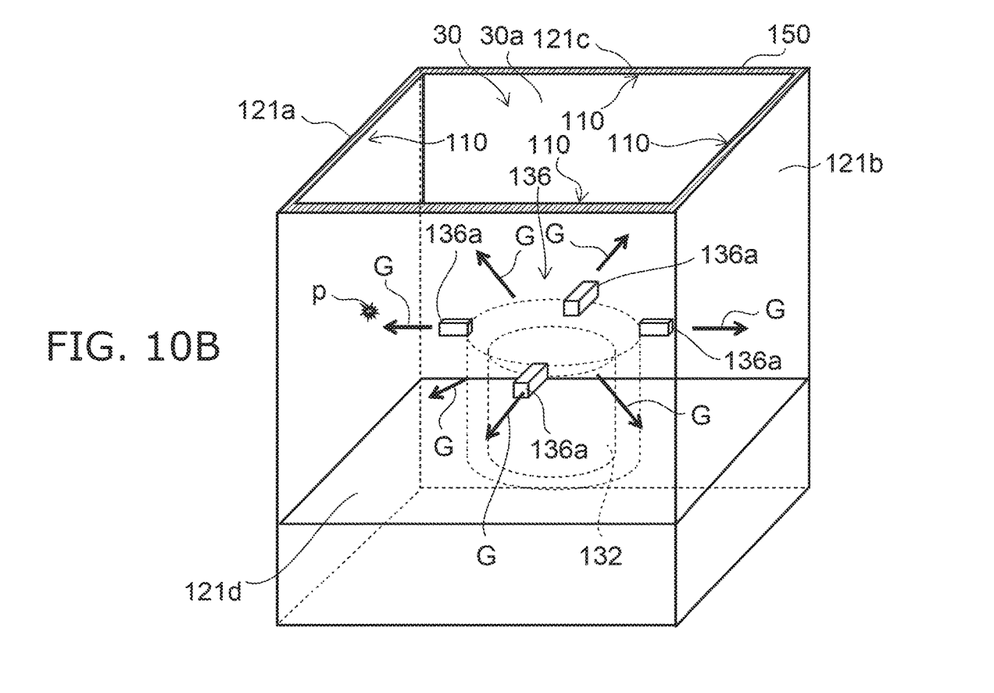

FIG. 10A and FIG. 10B are schematic views showing the gas supplier 136 of FIG. 9.

The gas supplier 136 blows a gas G toward the first surface 30a of the first member 30. In other words, an air flow of the gas G toward the first surface 30a is produced. The air flow may be either laminar flow or turbulent flow.

As shown in FIG. 10A, the processing chamber 150 has a first side surface 121a to which the gas supplier 136 is mounted, and a second side surface 121b to which the dust collection apparatus 110 is mounted. The dust collection apparatus 110 is mounted so that the first surface 30a of the first member 30 is on the inner side. The first side surface 121a opposes the second side surface 121b. For the dust collection apparatus 110 shown in FIG. 10A and FIG. 10B, only the first member 30 is shown; and the liquid supplier 10 and the liquid recoverer 20 are not shown.

An outlet 136a of the gas supplier 136 faces the first member 30. The gas G is blown out from the outlet 136a toward the first surface 30a of the first member 30. The outlet 136a may have an angle upward or downward.

Thereby, the particles p inside the processing chamber 150 are blown by the gas G and contact the first surface 30a. As shown in FIG. 10B, the processing chamber 150 has the first to fourth side surfaces 121a to 121d. The first side surface 121a opposes the second side surface 121b. The third side surface 121c opposes the fourth side surface 121d. The gas supplier 136 is provided in a radial configuration along the outer circumference of the processing cup 132 disposed at substantially the center of the processing chamber 150. The dust collection apparatus 110 is provided on each of the first to fourth side surfaces 121a to 121d. Each of the dust collection apparatuses 110 is mounted with the first surface 30a of the first member 30 on the inner side.

The outlets 136a of the gas supplier 136 face the first member 30 of each of the first to fourth side surfaces 121a to 121d. The outlets 136a are not limited to four outlets. The gas G is blown out in a radial configuration from the outlets 136a toward the first surfaces 30a of the first members 30. The outlets 136a may have angles upward or downward.

Thereby, similarly to FIG. 10A, the particles p inside the processing chamber 150 are blown by the gas G and contact the first surface 30a.

Thus, according to the embodiment, the particles p inside the processing chamber 150 are blown toward the first surface 30a and contact the first surface 30a more easily. Thereby, it is possible to remove the particles p more efficiently.

According to the embodiments, a dust collection apparatus and a dust collection system that can efficiently remove particles can be provided.

Hereinabove, embodiments of the invention are described with reference to specific examples. However, the invention is not limited to these specific examples. For example, one skilled in the art may similarly practice the invention by appropriately selecting specific configurations of components of the liquid supplier, the liquid recoverer, the first member, etc., from known art; and such practice is within the scope of the invention to the extent that similar effects can be obtained.

Further, any two or more components of the specific examples may be combined within the extent of technical feasibility and are included in the scope of the invention to the extent that the purport of the invention is included.

Moreover, all dust collection apparatuses practicable by an appropriate design modification by one skilled in the art based on the dust collection apparatuses described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A dust collection system, comprising:
    a dust collection apparatus including
        a liquid supplier,
        a liquid recoverer, and
        a first member provided between the liquid supplier and the liquid recoverer, the first member having a first surface and a plurality of trenches provided in the first surface, the plurality of trenches extending in a direction toward the liquid recoverer from the liquid supplier; and
    a processing chamber containing the dust collection apparatus, wherein
        the first surface of the first member is exposed to ambient air in the processing chamber, and
        the liquid supplier provides liquid flowing over the first surface along the plurality of trenches to the liquid recoverer, the liquid collecting dust particles in the ambient air while flowing over the first surface.

2. The system according to claim 1, wherein
the processing chamber includes:
    a support platform supporting a processing object;
    a mounting surface where the support platform is mounted;
    a bottom surface provided on a lower side of the mounting surface; and
    a side surface provided around the support platform with a direction from the bottom surface toward the support platform as an axis, and
the dust collection apparatus is provided attachably and removably on at least one surface of the bottom surface, the mounting surface, or the side surface.

3. The system according to claim 2, wherein
the first surface is disposed along the side surface, and
the liquid supplier is positioned above the liquid recoverer.

4. The system according to claim 2, wherein
the first surface is disposed along the mounting surface or the bottom surface,
the liquid supplier is disposed at a position higher than the liquid recoverer, and
the first surface is tilted with respect to a direction of gravity.

5. The system according to claim 1, wherein the processing chamber further includes a gas supplier blowing a gas toward the first surface.

* * * * *